(12) United States Patent
Bascle et al.

(10) Patent No.: US 7,571,483 B1
(45) Date of Patent: Aug. 4, 2009

(54) SYSTEM AND METHOD FOR REDUCING THE VULNERABILITY OF A COMPUTER NETWORK TO VIRUS THREATS

(75) Inventors: Jeff P. Bascle, Orlando, FL (US); Stephen M. Blair, Jr., Orlando, FL (US); Paul David Mahaffey, Jr., Orlando, FL (US); Jason J. Quest, Gainesville, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 804 days.

(21) Appl. No.: 11/211,867

(22) Filed: Aug. 25, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl. ...................................... 726/24
(58) Field of Classification Search ............... 726/22, 726/24
See application file for complete search history.

(56) References Cited

U.S. PATENT DOCUMENTS

| | | | | |
|---|---|---|---|---|
| 5,349,662 | A * | 9/1994 | Johnson et al. | 717/127 |
| 5,440,723 | A * | 8/1995 | Arnold et al. | 714/2 |
| 5,826,013 | A | 10/1998 | Nachenberg | |
| 5,832,208 | A | 11/1998 | Chen et al. | |
| 6,003,132 | A | 12/1999 | Mann | |
| 6,088,803 | A * | 7/2000 | Tso et al. | 726/22 |
| 6,393,568 | B1 * | 5/2002 | Ranger et al. | 713/188 |
| 6,735,702 | B1 * | 5/2004 | Yavatkar et al. | 726/13 |
| 7,043,757 | B2 * | 5/2006 | Hoefelmeyer et al. | 726/24 |
| 7,051,369 | B1 * | 5/2006 | Baba | 726/23 |
| 7,089,589 | B2 * | 8/2006 | Chefalas et al. | 726/22 |
| 7,096,500 | B2 * | 8/2006 | Roberts et al. | 726/24 |
| 7,114,183 | B1 * | 9/2006 | Joiner | 726/23 |
| 7,228,565 | B2 * | 6/2007 | Wolff et al. | 726/24 |
| 7,231,637 | B1 * | 6/2007 | McEwan | 717/171 |
| 7,257,630 | B2 * | 8/2007 | Cole et al. | 709/224 |
| 7,278,019 | B2 * | 10/2007 | Norman | 713/170 |
| 7,352,280 | B1 * | 4/2008 | Rockwood | 340/521 |
| 7,356,689 | B2 * | 4/2008 | Burch et al. | 713/153 |
| 7,363,655 | B2 * | 4/2008 | Franczek et al. | 726/22 |
| 7,386,888 | B2 * | 6/2008 | Liang et al. | 726/23 |
| 7,418,733 | B2 * | 8/2008 | Connary et al. | 726/25 |
| 7,434,261 | B2 * | 10/2008 | Costea et al. | 726/22 |
| 2002/0116639 | A1 * | 8/2002 | Chefalas et al. | 713/201 |
| 2002/0138766 | A1 * | 9/2002 | Franczek et al. | 713/201 |
| 2002/0147915 | A1 * | 10/2002 | Chefalas et al. | 713/188 |

(Continued)

OTHER PUBLICATIONS

SmartCop Anti-Virus, http://www.s-cop.com/LAN-scop.features.html; printed May 11, 2005.

*Primary Examiner*—David Garcia Cervetti
(74) *Attorney, Agent, or Firm*—Christine Q. McLeod; Beusse Wolter Sanks Mora & Maire, PA

(57) ABSTRACT

A method for reducing vulnerability of a computer network to a detected virus threat includes receiving an identifier of a network device detected as a source of virus activity. The method also includes relating the identifier to a predetermined account of the detected device and then automatically disabling the device account. Accordingly, the detected device is isolated from the network to prevent infection of the network by the detected device.

13 Claims, 3 Drawing Sheets

U.S. PATENT DOCUMENTS

| | | | |
|---|---|---|---|
| 2002/0174350 A1* | 11/2002 | Franczek et al. | 713/188 |
| 2002/0174358 A1* | 11/2002 | Wolff et al. | 713/200 |
| 2002/0194489 A1* | 12/2002 | Almogy et al. | 713/200 |
| 2003/0009554 A1* | 1/2003 | Burch et al. | 709/224 |
| 2003/0084319 A1* | 5/2003 | Tarquini et al. | 713/200 |
| 2003/0084322 A1* | 5/2003 | Schertz et al. | 713/200 |
| 2003/0145228 A1* | 7/2003 | Suuronen et al. | 713/201 |
| 2004/0044912 A1* | 3/2004 | Connary et al. | 713/201 |
| 2004/0064726 A1* | 4/2004 | Girouard | 713/201 |
| 2004/0088564 A1* | 5/2004 | Norman | 713/200 |
| 2004/0088570 A1* | 5/2004 | Roberts et al. | 713/201 |
| 2004/0117640 A1* | 6/2004 | Chu et al. | 713/188 |
| 2004/0230827 A1* | 11/2004 | Franczek et al. | 713/200 |
| 2005/0050334 A1* | 3/2005 | Liang et al. | 713/188 |
| 2005/0050335 A1* | 3/2005 | Liang et al. | 713/188 |
| 2005/0050336 A1* | 3/2005 | Liang et al. | 713/188 |
| 2005/0050338 A1* | 3/2005 | Liang et al. | 713/188 |
| 2005/0050378 A1* | 3/2005 | Liang | 714/4 |
| 2005/0086499 A1* | 4/2005 | Hoefelmeyer et al. | 713/188 |
| 2005/0086526 A1* | 4/2005 | Aguirre | 713/201 |
| 2005/0132216 A1* | 6/2005 | Franczek et al. | 713/200 |
| 2005/0240780 A1* | 10/2005 | MacIsaac | 713/188 |
| 2005/0257249 A1* | 11/2005 | Shay | 726/3 |
| 2005/0262569 A1* | 11/2005 | Shay | 726/26 |
| 2005/0268342 A1* | 12/2005 | Shay | 726/26 |
| 2005/0283479 A1* | 12/2005 | Wahl et al. | 707/9 |
| 2005/0283600 A1* | 12/2005 | Giannotti et al. | 713/2 |
| 2005/0283828 A1* | 12/2005 | Perley et al. | 726/4 |
| 2006/0036727 A1* | 2/2006 | Kurapati et al. | 709/224 |
| 2006/0041941 A1* | 2/2006 | Suzuki et al. | 726/24 |
| 2006/0070130 A1* | 3/2006 | Costea et al. | 726/24 |
| 2006/0129670 A1* | 6/2006 | Mayer | 709/223 |
| 2006/0288414 A1* | 12/2006 | Kuroda | 726/24 |
| 2006/0294587 A1* | 12/2006 | Bowden et al. | 726/22 |
| 2007/0094730 A1* | 4/2007 | Bhikkaji et al. | 726/24 |
| 2007/0143851 A1* | 6/2007 | Nicodemus et al. | 726/25 |
| 2007/0220602 A1* | 9/2007 | Ricks et al. | 726/22 |
| 2007/0282951 A1* | 12/2007 | Selimis et al. | 709/205 |
| 2008/0250496 A1* | 10/2008 | Namihira | 726/22 |
| 2008/0301298 A1* | 12/2008 | Bernardi et al. | 709/226 |

* cited by examiner

SYSTEM AND METHOD FOR REDUCING THE VULNERABILITY OF A COMPUTER NETWORK TO VIRUS THREATS

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

TECHNICAL FIELD

The present invention relates to network systems management. More specifically, the invention relates to method, system, and program for reducing the vulnerability of a computer network to virus threats.

BACKGROUND ART

In today's networked computing environment, it is often difficult to prevent the spread of computer system integrity threats such as viruses, worms, and Trojan horses, due to an increased visibility of computer system vulnerabilities and expedited creation of computer system integrity threats against these vulnerabilities. Vendors of operating system and application software routinely announce the release of a software patch or software version update that remediates a newly publicized vulnerability. As soon as such vulnerabilities are announced, malicious coders begin working on threats to attack these vulnerabilities. The time cycle between the publication of a new vulnerability and the release of a corresponding threat on the public Internet is rapidly declining. For example, threats, such as computer viruses, may be released within hours of a software patch release instead of days, weeks, or months as was common in the past.

In a large network environment such as an enterprise network, the logistics of testing and applying such patches and updates across multiple computer systems often prevents many vulnerable computer systems from being secured (patched or updated) before a threat is released. To some extent, system management and software deployment tools help to expedite the deployment of these patches and updates, but large environments may still experience substantial penetration by these threats. This risk of penetration is increased when software patches and updates are released after a threat has targeted a vulnerability.

Often times, virus defense software vendors will release virus definitions (virus signature updates) to combat these threats, but the distribution of virus definition files to large networks of computer systems presents a similar logistical challenge. The virus defense software located on each computer system is only as effective as the most recently distributed virus definition file. Until these systems are updated with the latest definitions, they are powerless to defend themselves from threats with such definitions.

Another existing approach to defending against virus attacks is to utilize a local detection agent that validates system configuration state before allowing a system to connect to the network. An example of such a system is Network Admission Control (NAC), marketed by Cisco Systems Inc. Although such techniques may be useful for verifying the presence and activation state of protective agent software, it too is faced with limitations. The NAC agent is only as effective as its last distributed security policy, and the agents that it is validating (virus, personal firewall, etc.) can only defend against threats pre-defined in their signature files.

The end result is that even in well-protected environments, virus threats will be experienced, and these threats can create significant damage once resident in a networked computer system, such as a corporate intranet. Existing solutions may mitigate the risks associated with a virus not yet experienced, or prevent systems with weak protection from joining a network. However, such systems are ineffective at reducing the risk associated with an active, dynamic network once a virus threat has already been introduced.

Accordingly, there is a need in the art for improvements in reducing the vulnerability of a computer network to virus threats. There is a continuing need in the art for a system that can respond to detected threats to automatically limit further exposure of the computer network to the detected threat. The present invention is designed to address these needs.

SUMMARY OF THE INVENTION

Broadly speaking, the invention relates to method, system, and program for reducing the vulnerability of a computer network to virus threats.

The invention can be implemented in numerous ways, including as a system (including a computer processing system), a method (including a computerized method), an apparatus, a computer program product. Several embodiments of the invention are discussed below.

As a method, an embodiment of the invention is described for reducing vulnerability of a computer network to a detected virus threat wherein the network is being monitored by a network monitoring program detecting network activity indicative of a virus threat. The method reduces the vulnerability by receiving, from the monitoring program, an identifier of a network device detected as a source of virus activity, relating the identifier to a predetermined account of the detected device and automatically disabling the device account, thereby isolating the detected device from the network to prevent infection of the network by the detected device.

The method of the present invention may be implemented as a computer program product with a computer-readable medium having code thereon. The program product includes a program and a signal bearing media bearing the program. The invention may also be implemented as computer executable software code transmitted as an information signal, in accordance with the methods of the invention.

As a computer system, an embodiment of the invention includes code devices executed by a processor of a computer system for receiving, from the monitoring program, an identifier of a device connected to the network and identified as a source of the activity and relating the identifier to a predetermined account of the detected device. The system further includes code devices for automatically disabling the device account, thereby isolating the detected device from the network to prevent infection of the network by the detected device. Specifically, the code devices (i.e., software, firmware, computer instructions, and the like) execute the methods of the invention.

As an apparatus, the present invention may include at least one processor, a memory coupled to the processor, and a program residing in the memory which implements the methods of the present invention as described herein.

The system may also include at least one server operably coupled to a communications network, capable of accessing a database, and responsive to the computer network monitoring program. The system also includes computer software resident on a computer readable medium in communication with the server for receiving, from the monitoring program, an identifier of a network device detected as a source of virus activity, relating the identifier to a predetermined account of the detected device and automatically disabling the device account, thereby isolating the detected device from the network to prevent infection of the network by the detected device.

In a networked client-server computing environment having a server computer and a database containing network system management data, a method for reducing a vulnerability of a computer network to a detected virus threat, wherein the network includes a computer network monitoring program detecting computer network activity indicative of a virus threat, comprises receiving, from the monitoring program, an identifier of a network device detected as a source of virus activity, relating the identifier to a predetermined account of the detected device and automatically disabling the device account, thereby isolating the detected device from the network to prevent infection of the network by the detected device.

Accordingly, the present invention solution allows for isolating and disabling remote systems detected as being infected by a virus, thereby reducing an overall network vulnerability to a spread of a virus infection. This system may act in response to an indication of a virus threat to a system, such as indication of abnormal application traffic, abnormal utilization patterns, or malicious activity provided, for example, by network traffic analyzers, intrusion detection devices, system logs, access control lists, and/or virus detection software.

By interfacing with multiple detection methodologies, the system advantageously removes dependence on updating configurations, policies, or signature files on remote computer systems. The system automatically identifies the infected system and acts to isolate that system by automatically disabling access from the infected device and users of the device. The resultant actions prevent the user and infected computer system from interfacing with additional resources within the computer network (such as file and e-mail servers), thereby, reducing the potential contamination and spread of infection to additional computer systems within the network.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
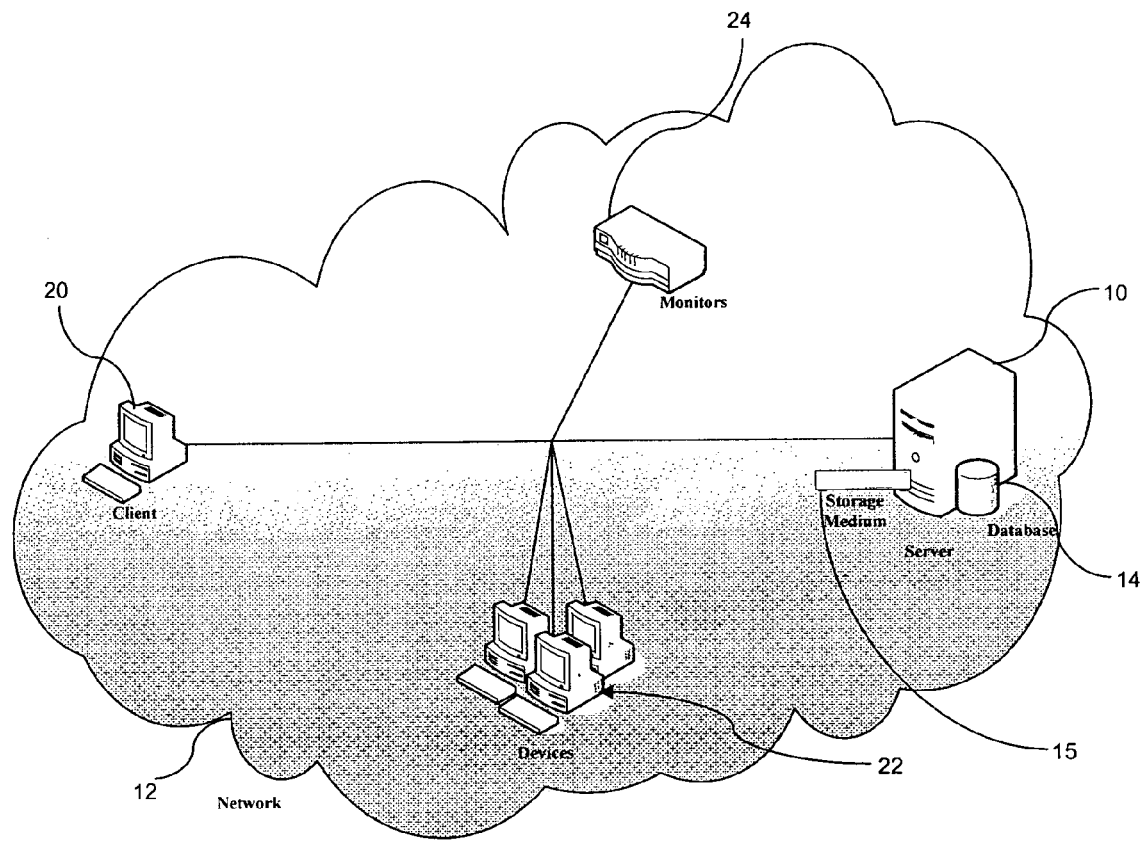
FIG. 1 is an exemplary hardware environment used to implement an embodiment of the invention.

It should be understood that in certain situations for reasons of computational efficiency or ease of maintenance, the ordering and relationships of the blocks of the illustrated flow charts could be rearranged or re-associated by one skilled in the art. While the present invention will be described with reference to the details of the embodiments of the invention shown in the drawings, these details are not intended to limit the scope of the invention.

DETAILED DESCRIPTION

The inventors of the present invention have innovatively recognized that by receiving an indication of a virus threat to a computer network and automatically isolating infected computers and preventing users of infected computers from accessing the network, further infection of the network may be quickly and effectively prevented.

To facilitate an understanding of the present invention, it is described hereinafter with reference to specific implementations thereof. The invention is described in the general context of computer-executable instructions, such as program modules, being executed by a computer. Generally, program modules include routines, programs, objects, components, data structures, etc. that perform particular tasks or implement particular abstract data types. For example, the software programs that underlie the invention can be coded in different languages, for use with different platforms. In the description that follows, examples of the invention are described in the context of a networked computer system being monitored for virus threats. It will be appreciated, however, that the principles that underlie the invention can be implemented with other types of computer software technologies as well.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Definitions

Throughout the specification, the following terms are used as defined herein:

Enterprise Network: In a large enterprise, a distributed network of computer systems which can span diverse geographical locations and encompass a range of platforms, operating systems, protocols, and network architectures.

Server: A personal computer, a minicomputer, or a mainframe which provides some service for other computers connected to it via a network such as data management (information sharing between clients), network administration, security, and other back-end functions.

Database: One or more large structured sets of persistent data, usually associated with software to update and query the data. A relational database allows the definition of data structures, storage and retrieval operations and integrity constraints. In such a database the data and relations between them are organized in tables.

Client: A computer system or process that requests a service of another computer system or process (a "server") using some kind of protocol and accepts the server's responses. A client is part of client/server software architecture.

Client/server architecture: A common form of distributed system in which software is split between server tasks and client tasks. In operation, a client sends requests to a server, asking for information or action, and the server responds.

Management Server: A central reception and correlation server for a Network Management System (NMS) (e.g., an IBM AIX Server running Tivoli NMS software).

Monitored Device: A server (e.g., NT or UNIX), a client, or network device/object (e.g., router, switch, hub, etc.) operably connected to a network and being monitored for threats and managed in response to detected threats.

Managed Domain: A logical grouping of managed device elements representing either a geographic, functional, or other logical relationship with other managed elements.

Virus: A computer code used to attempt to compromise the integrity of a computer system. The term virus includes, but is not limited to, a computer virus, a Trojan horse, or a worm used to attack a computer system and threaten its data integrity and operation.

NetBIOS: Network Basic Input Output System. An application interface that augments DOS BIOS by adding special functions for local-area networks.

RPC: Remote Procedure Call. A type of protocol that allows a program on one computer to execute a program on a server computer.

LDAP: Lightweight Directory Access Protocol. An Internet protocol that email programs can use to look up contact information from a server.

Active Directory: A directory service for Microsoft Windows

ODBC: Open Database Connectivity. A standard database access method that makes it possible to access any data from any application, regardless of a type of database management system handling the data.

Overview

Referring now to the drawings, embodiments of the present invention will be described. Generally speaking, the invention protects a computer network from spread of a computer virus by preventing monitored devices and users from accessing the network if the device or uses have been associated with activity indicative of a virus infection. The invention receives, from a monitoring program, an identifier of a device connected to the network and identified as a source of virus activity and automatically isolates the device from the network to prevent further infection of the network by the device. The invention also automatically identifies a user of the isolated device having accessed the device during the activity and automatically prevents the identified user from accessing the computer network to prevent further infection of the network by the user.

Hardware Environment

FIG. 1 shows a simple computing system environment/network in which the present invention may be implemented in a client/server arrangement. In an exemplary embodiment, the computing system includes at least one server 10 including a database 14 and a software medium 15 in communication with the server 10, a client computer 20, and a plurality of devices 22, such as other client computers, and/or network components such as routers, switches, and/or hubs, operably connected to the network 12. Server 10 may be any of a number of known computers, or network of computers. Similarly, the client computer 20 may be any of a number of known computers, or network of computers, capable of supporting a web browser such as Microsoft Internet Explorer or Netscape Navigator. Server 10 and client computer 20 are coupled to one another via a network 12, such as an Intranet or the Internet. Server 10, client 20, and devices 22 may be granted access to the network 12 according to network accounts granting such access. All of the interconnected components may form an "enterprise." Each of the components across the network 12 may be monitored by one or more network monitors 24, for example, which may include one or more of a network traffic analyzer, an intrusion detection device, a system logger, a network access controller or virus detection module. In an embodiment, a client 20 may be configured as a network monitor 24 running a network monitoring program for detecting conditions of the network 12 and clients 20 and other devices 22 on the network for activity indicative of a virus infection. Each of the components across the network 12 may be managed by a network management system. Network management systems provide network management data for IT professionals and administrators as known in the art.

More specifically, the client computer 20 may be complete, stand-alone, personal computer offering a full range of power and features to run applications. The client computer 20 preferably operates under any operating system and includes communication devices, input devices, storage devices, and display devices. A user enters input commands into the computer processor through input devices which could comprise a keyboard, mouse, or the like. Alternatively, the input device could comprise any device used to transfer information or commands. The display comprises a computer monitor, television, LCD, LED, or any other means to convey information to the user. In an embodiment, the user interface may include a graphical user interface (GUI) reporting virus remediation information for one or more devices interconnected on a network and being identified as experiencing activity indicative of a virus threat.

The server computer(s) 10 may be a personal computer, a minicomputer, or a mainframe and offer data management (information sharing between clients), network administration, security, web services, and other functions.

The present invention also envisions other computing arrangements for the client/server components, including processing on a single machine such as a mainframe, a collection of machines, or other suitable means. Although many other internal components of the client/server components are not shown, those of ordinary skill in the art will appreciate that such components and the interconnection are well known. Accordingly, additional details concerning the internal construction of the client/server components and networking need not be disclosed in connection with the present invention.

In an exemplary embodiment, the present invention may be implemented using a personal computer as a client computer 20 having a connection to a network 12, such as the Internet. A server computer 10 is connected to the same network 12 and adapted to communicate with the devices connected to the network 12, such as client computer 20, and receive information form network monitors 24. In this context, the server computer 10 can be implemented using hardware suitable for an Internet web server and corresponding web server software, such as the Microsoft Internet Information Server product. In an aspect of the invention, the server computer 10 may be able to access a client computer's NetBIOS name table and registry to retrieve the currently logged in users on the client 20 and the client's host name, respectively.

The server 10 includes computer code for receiving virus intrusion information from the network monitors 24 and for controlling access to the network 12 by identified virus compromised clients 20 and/or other devices 22, and users of those clients 20 and/or devices 22 during the identified virus intrusion activity. Such code may be written in a variety of computer languages, such as Microsoft .NET programming language (runtime environment). The present method could also be implemented in a variety of ways, such as by comprising a portion of an operating system source code, as part of an application or simply as an independent program, such as one written in the programming languages Java, C++, and the like.

The invention may access one or more databases 14 (e.g., an external Oracle database running on an IBM AIX server) to retrieve user and systems management information stored on the database 14. For example, when the database 14 is configured using Microsoft's Active Directory service, information, such as user schema data, may be retrieved using an LDAP query. The database 14 may reside on the server computer 10 or may reside on a separate computer or database in communication with the server computer via a network 12 such as the Internet. Likewise, the database 14 may reside on media such as a CD-ROM accessible using a CD-ROM drive associated with the server computer 10. The database 14 may be accessed using a standard database access call such as by using an ODBC protocol. The database 14 contains at least one table having fields corresponding to the individual items of identifying information sought related to user (e.g., user profile) and systems management data. Additional tables may be included to assist in managing information. For large-scale data collecting, another embodiment could include using the above-described method with a plurality of databases and a search service, or separate process, for conducting a search across multiple databases. As will be understood by those skilled in the art, the search service receives requests for user and systems management data from the server computer 10 and conducts a search of corresponding data among the plurality of databases as described above for a single database.

In an exemplary embodiment, the invention is based on a relational enterprise management data model that may associate certain groups of users into logical domains, such as subnets of the network based on geographical, functional, or other criteria for logically associating devices. The enterprise management data model provides a structure for delivering comprehensive enterprise scaled system management capabilities. The model provides for distributed administration, logical device association, and association of disparate data sources.

Operation

Figure 2:
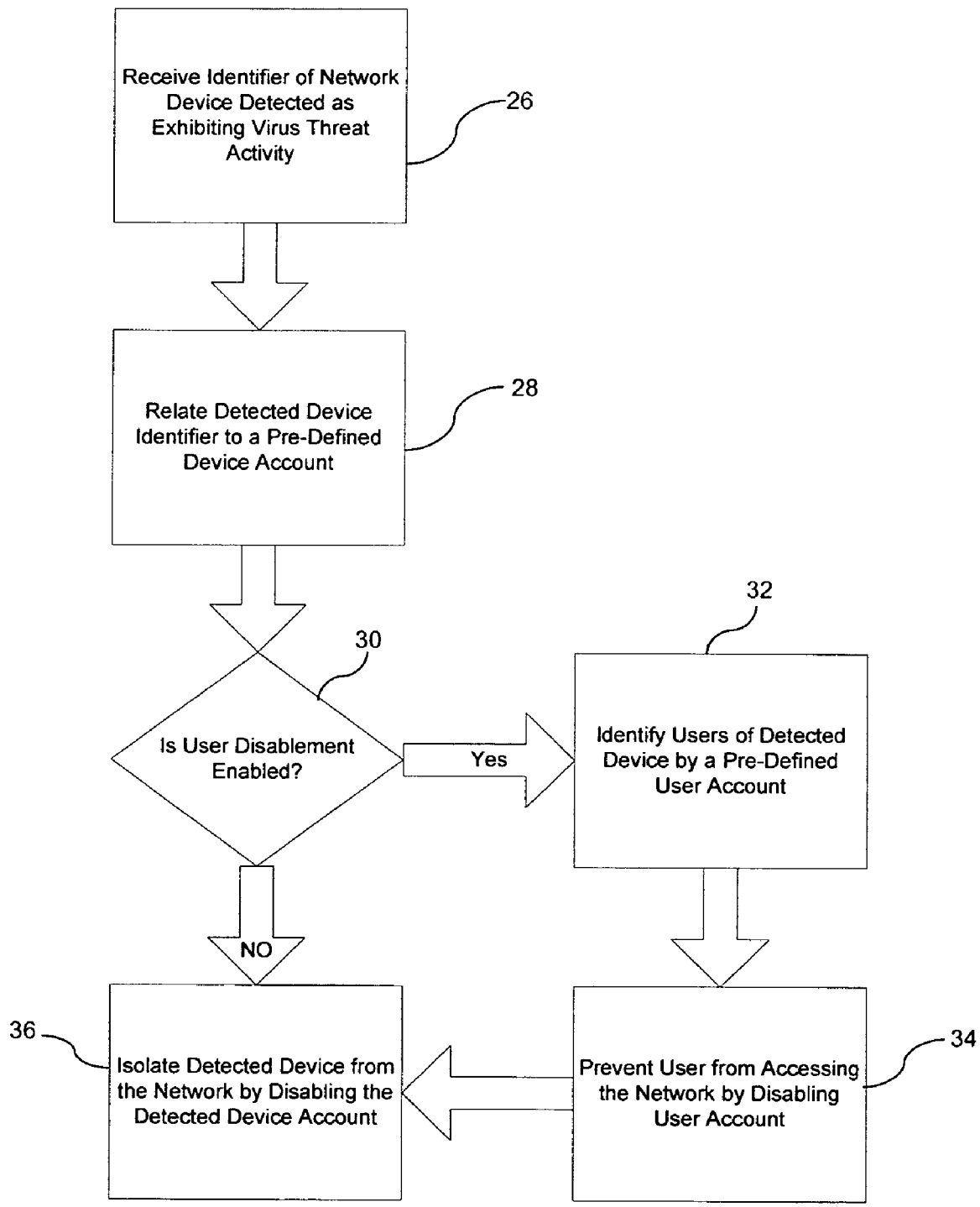
FIG. 2 is a flow diagram illustrating the steps performed in practicing an embodiment of the present invention.

Referring now to FIG. 2, a flowchart illustrating the steps of an embodiment of the invention is shown. A method for reducing vulnerability of a computer network to a detected virus threat includes the steps of receiving an identifier of a network device detected as a source of virus activity, relating the identifier to a predetermined account of the detected device; and automatically disabling the device account, thereby isolating the detected device from the network to prevent infection of the network by the detected device. Specifically, as shown in FIG. 2, the method includes receiving, from a computer network monitor detecting computer network activity indicative of a virus threat, an identifier, such as a network address, of a device, such as a client, connected to the network being identified as a source of the virus threat activity 26. The monitor, running a monitoring program, may provide information (such as an IP address of a client) connected to the network and exhibiting activity indicative of a virus infection to a server configured for receiving the identifier and automatically performing remediation steps to decrease the vulnerability of the network to the virus threat.

The method further includes relating a detected device identifier to a predefined device account 28. If user disablement is disabled 30, the method includes isolating the detected device from the network by disabling the detected device account 36 to prevent further infection of the network by the device. For example, the method may include making a remote connection to the identified device, such as a client, using NetBIOS and RPC network communication protocols and retrieving the client's host name from the client's registry to allow disabling the host's network access account.

If user disablement is not disabled in step 30, the method includes identifying users of the detected device by a predefined user account 32. To identify a user, the method may include remotely connecting to the isolated device querying the device to determine users logged on to the device during the activity. For example, the method may include making a remote connection to the identified device using NetBIOS and RPC network communication protocols and retrieving the name of associated (logged on) user(s) accounts from the computer system's NetBIOS name table and the computer system's registry.

After a user of the suspect device is identified, the method includes preventing an identified user from accessing the network by disabling the user's account 34 to prevent further infection of the network. For example, the method may execute an LDAP query to an Active Directory on a network server to retrieve the user schema data for the identified user's account. The user schema data may include useful contact information such as the user's given name, location, account, domain membership information, phone number, and e-mail address. The retrieved user schema data may then be used to disable the user's account, such as by setting an account disabled flag and/or changing the user's account password. Accordingly, the user is preventing from further accessing the network from another network client, thereby reducing the user's ability to further infect the network. For example, the disabled user is preventing from logging on to a different computer and attempting to read email that may have been the source of the identified infection, thereby resulting in further infection of the network. The detected device is then isolated from the network by disabling the detected device account 36.

In an aspect of the invention, an occurrence of the identified user's account being disabled as a result of detected virus threat activity is automatically reported to an account manager of the network. For example, an instance of a user's account being disabled may be automatically reported to an account provisioning tool that maintains user account information for the network. An ODBC call may be made to a database of the provisioning tool, or an import file in the format of the account provisioning tool may be formatted to report account disablement. Accordingly, the account provisioning tool may be updated on the fly with the most current disablement information responsive to a virus threat. By disabling a user's account, the user will be encouraged to contact a system manager to find out why the user's account has been disabled. Accordingly, the user may be enlisted to assist in remediation of the infected client computer.

In another embodiment, the method may include automatically storing information related to the detected virus threat. For example, the identified user, the identified user's account information, the network address of the identified device, and/or a description of the identified threat may be stored in a database accessible on the network, such as by making an ODBC call to the database. Accordingly, the stored information may be made available to other users of the network, such as system managers and virus response teams. In another embodiment, the identified user may be automatically added to a to virus watch list accessible, for example, by system manager of the network responsible for virus identification and remediation.

In yet another embodiment, the method includes automatically providing respective alerts to other users, such as members of a logical domain of which the identified user is a member. Alerts may be sent out to members of the identified user's subnet, the infected user's business area of the enterprise, and/or a virus response team and system subnet managers associated with the identified user. For example, an ODBC call may be made to a database accessible on the network to retrieve a listing of security investigators associated with the domain, (such as a subnet range of the infected IP address) of the infected user. The method may further include formatting an activity report which contains the threat data, user contact data, and computer system data. This activity report is then forwarded to the e-mail addresses of the other users and/or system mangers associated with the identified user.

Figure 3:
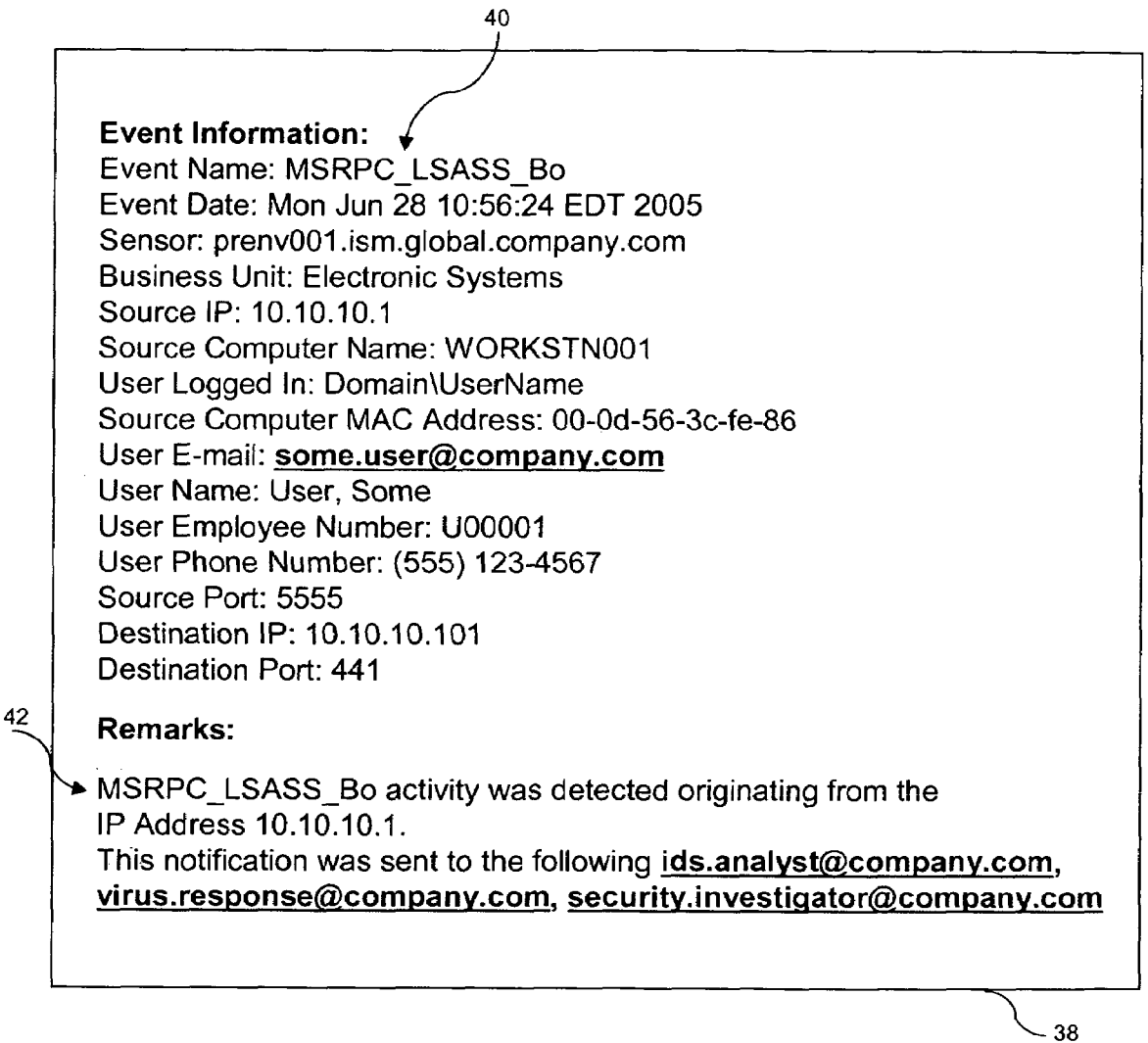
FIG. 3 is an exemplary graphical user interface (GUI) for reporting virus remediation information according to an embodiment of the invention.

Turning now to FIG. 3, an exemplary graphical user interface (GUI) display 38 for reporting virus remediation information, such as threat and user disablement information, is shown. Threat event information 40, such as the identified source IP address, the user logged during the threat, and user contact information may be displayed in an event display area. The GUI display may report related users and/or system managers notified in a remarks display area 42.

As a computer system, an embodiment of the invention includes code devices executed by a processor of a computer system for receiving, from the monitoring program, an identifier of a device connected to the network and identified as a source of the activity and automatically isolating the device from the network to prevent further infection of the network by the device. The system further includes code devices for automatically identifying a user of the isolated device having accessed the device during the activity and automatically preventing the identified user from accessing the computer network to prevent further infection of the network by the user. Specifically, the code devices (i.e., software, firmware, computer instructions, and the like) execute the methods of the invention.

The system may also include at least one server 10, capable of communicating with the devices and accessing a database. The server includes computer software resident on a software medium in communication with the server and operational for receiving an identifier of a network device detected as a source of virus activity, for relating the identifier to a predetermined account of the detected device, and for automatically disabling the device account, thereby isolating the detected device from the network to prevent infection of the network by the detected device.

In a networked client-server computing environment as shown in FIG. 1, for example, having a server computer 10 with executable software and a database 14 containing network system management data, a method for reducing a vulnerability of the networked environment to detected virus threats, the network 12 having a computer network monitoring program detecting computer network activity indicative of a virus threat, may include receiving an identifier of a network device, such as a client, detected as a source of virus activity, relating the identifier to a predetermined account of the detected device; and automatically disabling the device account, thereby isolating the detected device from the network to prevent infection of the network by the detected device.

In another embodiment, the invention includes a computer program product comprising software recorded on a computer readable medium and operational on a computer for reducing a vulnerability of a computer network to a detected virus threat. The operation includes receiving an identifier of a network device connected to the network and identified as a source of virus activity, relating the identifier to a predetermined-account of the detected device; and automatically disabling the device account, thereby isolating the detected device from the network to prevent infection of the network by the detected device.

In another aspect of the invention, a method, an apparatus, and a computer program are provided for reducing a vulnerability of a computer network 12 to a detected virus threat.

Based on the foregoing specification, the invention may be implemented using computer programming or engineering techniques including computer software, firmware, hardware or any combination or subset thereof, wherein the technical effect is to reduce the vulnerability of a computer network to virus threats. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, peni voice, touch screen, or any other means by which a human can input data into a computer, including through other programs such as application programs.

It should be understood that the examples and embodiments described herein are for illustrative purposes only and that various modifications or changes in light thereof will be suggested to persons skilled in the art and are to be included within the spirit and purview of the claims.

What is claimed is:

1. A method for reducing vulnerability of a computer network to a detected virus threat from both a network device detected as a source of virus activity and a user of the detected device, the method comprising the steps of:
receiving an identifier of a network device detected as a source of virus activity from a network monitor monitoring a network of devices for activity indicative of a virus;
relating the identifier to a predetermined account of the detected device;
automatically disabling the device account, thereby isolating the detected device from the network to prevent infection of the network by the detected device;
identifying, by a pre-assigned user account, a user of the detected devices during virus activity; and disabling the user account, thereby preventing the identified user from accessing the network, via another network device.

2. The method of claim 1, wherein disabling the user account comprises changing the identified user's password for logging on to the network.

3. The method of claim 1, wherein automatically identifying the user of the detected device comprises querying the detected device to determine users logged on to the device during the activity.

4. The method of claim 3, wherein the identifier comprises a network address of the detected device, the address being useable in querying the device.

5. The method of claim 1, further comprising automatically reporting the identified user's account to an account manager of the network.

6. The method of claim 1, further comprising automatically retrieving from a storage device predetermined contact information relating to the identified user.

7. The method of claim 6, further comprising automatically providing an alert to a system manager, using the retrieved contact information, to identify the user of the detected device.

8. The method of claim 7, further comprising automatically adding the identified user to a virus watch list accessible by system managers of the network.

9. A computer system having a processor, a memory, and an operating environment, the computer system operable to execute the method recited in claim 1.

10. A computer-readable medium having computer-executable instructions for performing the method recited in claim 1.

11. A computer program product comprising software recorded on a computer readable medium and operational on a computer for reducing a vulnerability of a computer network to a detected virus threat from both a network device detected as a source of virus activity and a user of the detected device, said operation comprising:

receiving an identifier of a network device connected to the network and identified as a source of virus activity from a network monitor monitoring a network of devices for activity indicative of a virus;

relating the identifier to a predetermined account of the detected device;

automatically disabling the device account, thereby isolating the detected device from the network to prevent infection of the network by the detected device;

automatically identifying by a pre-assigned user account, a user of the detected device during virus activity; and disabling the user account, thereby preventing the identified user from accessing the network.

12. A system for reducing a vulnerability of devices of a computer network to a detected virus threat from both a network device detected as a source of virus activity and a user of the detected device, the system comprising:

at least one server, capable of communicating with the devices and accessing a database, and computer software resident on the server and operational for receiving an identifier of a network device detected as a source of virus activity from a network monitor monitoring a network of devices for activity indicative of a virus, for relating the identifier to a predetermined account of the detected device, and for automatically disabling the device account, thereby isolating the detected device from the network to prevent infection of the network by the detected device; automatically identifying, by a pre-assigned user account, a user of the detected device during virus activity, and automatically disabling the user account, thereby preventing the identified user from accessing the network.

13. In a networked client-server computing environment having a server computer with executable software and a database containing network system management data, a method for reducing vulnerability of the networked environment to detected virus threats from both a network device detected as a source of virus activity and a user of the detected device, comprising the steps of:

receiving an identifier of a network device detected as a source of virus activity from a network monitor monitoring a network of devices for activity indicative of a virus;

relating the identifier to a predetermined account of the detected device;

automatically disabling the device account, thereby isolating the detected device from the network to prevent infection of the network by the detected device;

automatically identifying by a pre-assigned user account, a user of the detected device during virus activity; and disabling the user account, thereby preventing the identified user from accessing the network.

* * * * *